(12) United States Patent
Kelly (10) Patent No.: US 6,828,912 B2
(45) Date of Patent: *Dec. 7, 2004

(54) RESONANT TUBE SENSOR

(76) Inventor: John Michael Kelly, 7511 Snowpea Ct. Unit M, Alexandria, VA (US) 22306

( * ) Notice: Subject to any disclaimer, the term of this patent is extended or adjusted under 35 U.S.C. 154(b) by 14 days.

This patent is subject to a terminal disclaimer.

(21) Appl. No.: 10/012,598

(22) Filed: Nov. 6, 2001

(65) Prior Publication Data

US 2002/0167414 A1 Nov. 14, 2002

Related U.S. Application Data

(63) Continuation-in-part of application No. 09/854,500, filed on May 14, 2001.

(51) Int. Cl.[7] .............................................. G08B 21/00
(52) U.S. Cl. ...................... 340/612; 340/616; 340/618; 340/621
(58) Field of Search ................................ 340/612, 613, 340/616, 617, 621, 553

(56) References Cited

U.S. PATENT DOCUMENTS

| | | | | |
|---|---|---|---|---|
| 2,584,128 A | * | 2/1952 | Hldyard | ........................ 331/65 |
| 3,810,172 A | * | 5/1974 | Burpee et al. | ................. 342/27 |
| 4,189,722 A | * | 2/1980 | Lerner | ........................... 367/93 |
| 4,383,443 A | * | 5/1983 | Langdon | ..................... 73/290 V |
| 4,594,584 A | * | 6/1986 | Pfeiffer et al. | ............... 340/620 |
| 4,811,595 A | * | 3/1989 | Marciniak et al. | ............. 73/149 |
| 4,853,694 A | * | 8/1989 | Tomecek | ..................... 340/621 |
| 4,890,266 A | * | 12/1989 | Woodward | .................... 367/99 |
| 5,043,912 A | * | 8/1991 | Reus | ............................ 702/54 |
| 5,128,656 A | | 7/1992 | Watanabe | |
| 5,644,299 A | * | 7/1997 | Cruickshank | ................ 340/617 |
| 5,917,776 A | * | 6/1999 | Foreman | ........................ 367/93 |
| 6,142,015 A | * | 11/2000 | Getman et al. | ............ 73/290 V |

FOREIGN PATENT DOCUMENTS

JP 60-093314 * 10/1983 ............ G01F/17/00

OTHER PUBLICATIONS

U.S. patent application Ser. No. 09/854,500, Kelly, filed May 14, 2001.

* cited by examiner

Primary Examiner—Jeffery Hofsass
Assistant Examiner—Son Tang (57) ABSTRACT

Resonant decay sensors that determine a parameter based on the decay of acoustic standing waves in a tube. Parameters that can be determined include temperature, pressure, the level of a material in the tube, and the height of a material above an end of the tube. Resonant decay sensors can produce both point level and continuous level sensors. A vibration mount, such as a rubber ring, beneficially isolates an acoustic transducer from the body of the tube.

13 Claims, 3 Drawing Sheets

RESONANT TUBE SENSOR

This application is a CIP of 09/854,500 filed May 14, 2001.

FIELD OF THE INVENTION

This invention relates to resonant tube level sensors. More particularly, this invention relates to the use of acoustic waves for point level sensing, continuous level sensing, and pressure sensing.

BACKGROUND OF THE INVENTION

It is often necessary to determine (sense) the level of a material. In general, there are two main types of level sensing: point level sensing and continuous level sensing. Point level sensing determines whether a material is above or below a particular level, while continuous level sensing determines the material level relative to a reference point. It is possible to approximate a continuous level sensor using many point level sensors. Level sensors can be used to determine other parameters. For example, a manometer is a pressure sensor that uses the level of a liquid to determine pressure.

Numerous types of level sensors are known. For example, some level sensors use floats, tuning forks, electrical conductivity, ultrasonic time-of-flight, microwaves, optical reflections, tapes, magnetostriction, capacitance, electromagnetic time domain reflectometry, thermal conductivity, and pressure. In U.S. patent application Ser. No. 09/854,500, entitled "Resonant Tube Level Sensor," filed on May 14, 2001, I described a point level sensor based on acoustic resonance in a tube. The patent application is hereby incorporated by reference. Also, reference can be made to U.S. Pat. No. 5,128,656, entitled "Level Detecting Method and its Apparatus" issued on Jul. 7, 1992 to Watanabe for another systems that uses acoustic waves.

While all of the foregoing level sensors are useful, none is optimal in every application. For example, floats are often rather large and are subject to leaks and other failures, tuning forks thermal conductivity, and electrical conductivity sensors are sensitive to material build-up or are limited to certain types of materials, tapes are subject to breakage and require an operator, and magnetostriction, capacitance, ultrasonic, time domain reflectometry, and pressure are typically relatively expensive. While acoustic methods are very promising in that low cost, accurate systems that are relatively insensitive to material build-up and foams are achievable, some problems are evident. Problems with U.S. Pat. No. 5,128,656 and U.S. patent application Ser. No. 09/854,500 will now be discussed.

U.S. Pat. No. 5,128,656 and U.S. patent application Ser. No. 09/854,500 are both based on the physics of resonant tubes. A tube having an effective length L that is filled with a medium (usually a gas such as air) having a speed of sound of c can produce two different sets of resonant frequencies. If the tube is closed at both ends (or open at both ends) the possible resonant frequencies are:

$f_{nc} = nc/2L$, where $n=1, 2, 3$,

If the tube is open at one end and closed at the other end the possible resonant frequencies are:

$f_{no} = (2n-1)c/4L$, wherein $n=1, 2, 3$,

It should be noted that the length L is the effective length. As is well known, the resonant frequency of a tube is subject to an "end effect" in that an open tube is acoustically longer than the actual length, with the additional length depending on the radius of the tube's opening.

Since acoustic resonance is a fundamental physical property, its use in level sensing is beneficial. However, U.S. Pat. No. 5,128,656 appears to have drawbacks in that its method of sensing resonance is not particularly easy to implement, it may have operational reliability problems, and it appears to be difficult to use with caustic vapors. Furthermore, the sensor described in U.S. patent application Ser. No. 09/854,500 did not perform well enough over time and temperature for most practical commercial applications.

One problem with the sensor described in U.S. patent application Ser. No. 09/854,500 was that it worked well only with certain tube lengths. Furthermore, those tube lengths depended on the tube type. For example, copper tubes, plastic tubes and tubes having different wall thicknesses and inner diameters worked best with different tube lengths. Furthermore, once acceptable operation was achieved with a given tube, temperature changes (say by 10° F.) made operation erratic. Operation also tended to change over time (say 24 hours). Another problem was that system operation did not always follow the simple physical theory described above. For example, when acceptable operation was achieved with a "closed end" tube, changing frequency to obtain closed resonance at n+1 did not always work. However, the sensor described in U.S. patent application Ser. No. 09/854,500 is highly advantageous in that it has no moving parts (except for the transducer movement), is easy to fabricate, is low cost, rugged, and is difficult to clog.

Therefore, an improved acoustic resonance level sensor would be beneficial. Particularly beneficial would be an improved level sensor that operates on the principles described in U.S. patent application Ser. No. 09/854,500. Furthermore, a new level sensor that extends the principles of acoustic resonance as described in U.S. patent application Ser. No. 09/854,500 to continuous level sensing would be beneficial. Additionally, a new level sensor that extends the principles of acoustic resonance to sensing other parameters, including pressure, would be highly beneficial.

SUMMARY OF THE INVENTION

The principles of the present invention provide for point level sensors and for continuous level sensors that can sense the level of a material. Advantageously, the principles of the present invention enable sensing of many materials, including very light solids, such as feather, cotton, and powders, and of almost all liquids, including highly viscous liquids that tend to cling. Additionally, the principles of the present invention enable both temperature and pressure sensing.

A point level sensor according to the principles of the present invention includes a tube having a sense position (such as the end of the tube) and an acoustic assembly that produces sound in the tube. The acoustic assembly is mounted to reduce or eliminate vibrations in the tube body. A beneficial way of reducing or eliminating such vibrations is to use a vibration dampening material, such as a rubber compound, between the tube and a source of acoustic waves. A driver circuit can then drive the acoustic assembly in an attempt to produce a standing wave in the tube at the sensing position. After a time sufficient to produce a standing wave the driver circuit stops driving the acoustic transducer. An electronic network then monitors the decay of the acoustic waves in the tube to determine if a standing wave was produced. Based on that determination, a signal is produced that indicates whether a material has reached the sensing position. Multiple acoustic frequencies can be used to attempt to produce resonance. Beneficially, the acoustic frequency (or frequencies) that are used in the attempt(s) to produce resonance depends on temperature.

According to one embodiment of the present invention, the driver circuit drives the acoustic assembly with a frequency that would produce a standing wave if an end of the tube is open (the end of the tube then being the sensing position). If a standing wave is produced, as determined by the acoustic decay, a level signal is produced that indicates that a material has not reached the end of the tube. Beneficially, the system compensates for temperature effect on the speed of sound (which impacts on acoustic resonance).

According to another embodiment of the present invention, the driver circuit drives the acoustic assembly with a frequency that would produce standing waves if an end of the tube is closed (the end of the tube again being the sensing position). If a standing wave is produced, as determined by the acoustic decay, a level signal is produced that indicates that a material has reached the sensor end. Beneficially, the system compensates for temperature effect on the speed of sound (which impacts on acoustic resonance).

According to another embodiment of the present invention, the driver circuit drives the acoustic assembly with a frequency that would produce a standing wave if the material has reached a sense position inside the tube end. If a standing wave is produced, as determined by the acoustic decay, a level signal is produced that indicates that the material has reached the sense position. Beneficially, the system compensates for the effect of temperature on the speed of sound (which impacts on acoustic resonance).

In any of the foregoing embodiments, beneficially, the driver circuit drives the acoustic assembly at a plurality of possible resonant frequencies in an attempt to produce a standing wave. This enables temperature compensation and provides an easy method of compensating for changing vapor concentrations in the tube.

The driver can also drive the acoustic assembly at a frequency that cannot produce a standing wave (resonance). In that case, the presence of a standing wave is determined by comparing the acoustic decay in the tube at the possible resonant frequency against the acoustic decay in the tube at the frequency that cannot produce resonance.

Also beneficially, the driver circuit drives the acoustic assembly in an attempt to produce resonant when the sensor end is open and then when the end is closed. This enables a fail-safe approach in that the tube must be either open or closed (neglecting a small "transition range" where the tube is neither open nor closed). Beneficially, the system compensates for the effect of temperature on the speed of sound (which impacts on acoustic resonance).

The foregoing point level sensors can be used as a point level pressure sensor. To do so, the level of a material is arranged to depend on pressure (a manometer), and a sensing pressure is predetermined. Then, a sensing position is determined, with the sensing position being dependent on the level of the material in the tube when the sensing pressure is reached. Then, the point level pressure sensing system attempts to find the material level at the sensing position using the decay of a standing wave produced in the tube. When the material level reaches the sense position a determination is made that the pressure has reached the sensing pressure and a pressure signal is produced. Beneficially, the system compensates for the effect of temperature on the speed of sound (which impacts on acoustic resonance).

The principles of the present invention further provide for a continuous level sensor that senses the position of a material in a tube. A continuous level sensor according to the present invention uses multiple acoustic frequencies in attempts to induce a standing wave in a tube. The continuous level sensor includes an acoustic assembly for producing sound in the tube. Beneficially, the acoustic assembly is mounted to reduce or eliminate vibrations in the tube body. A beneficial way of reducing or eliminating such vibrations is to use a vibration dampening material, such as a rubber compound, between the tube and a source of acoustic waves. A driver circuit can then drive the acoustic assembly using multiple frequencies in an attempt to produce a standing wave. A sensing network then monitors the decays of the acoustic waves in the tube to determine if a standing wave was produced. Based on those acoustic decays, the frequency that produced a standing wave is found, then the level of a material in the tube is determined from that frequency. Beneficially, the continuous level sensor compensates for temperature effect on the speed of sound (which impacts on acoustic resonance).

The foregoing continuous level sensor can be used to measure temperature. A temperature sensor according to the principles of the present invention includes an acoustic assembly at an end of a tube (which can be either open or closed). Then, acoustic resonance in the tube is established. The temperature is then determined from the tube length and the resonate frequency.

The foregoing continuous level sensor also can be used as a pressure sensor. To do so, the level of a material is arranged to depend on pressure (a manometer). Then, the sensing system finds the material level, and from that material level, determines pressure from the frequency that produces a standing wave in the tube. Beneficially, the system compensates for the effect of temperature on the speed of sound (which impacts on acoustic resonance).

The principles of the present invention further provide for a method of determining whether a material being sensed has reached a predetermined level. In such a method, a sensor end of a tube is located at the predetermined level. An acoustic frequency attempts to create standing waves within the tube, but not in the body of the tube. The acoustic frequency is stopped, and the acoustic decay in the tube is monitored. A determination is then made as to whether standing waves occurred, and, based on that determination, a signal is produced that identifies whether the material being sensed has reached the predetermined level.

The principles of the present invention further provide for a method of determining the level of a material in a tube. In such a method, an end of the tube is located such that material has a level in the tube. Acoustic frequencies attempt to create standing waves within the tube. The decay of the acoustic frequencies are monitored. A determination is then made as to the frequency that produced a standing wave. From that frequency, the level of the material n the tube is determined. Beneficially, acoustic frequencies are not produced in the body of the tube.

DETAILED DESCRIPTION OF THE INVENTION

The principles of the present invention provide for various sensors that are based on the decay of acoustic waves in a tube. Such sensors are suitable for sensing the level of numerous materials, and are readily adapted to sense temperature and pressure. While the principles of the present invention are incorporated in the various assemblies and circuits shown in FIGS. 1–4, it is to be understood that those figures simply illustrate those principles, and that numerous alternatives, variations, uses, and adoptions of those principles are possible. Therefore, the present invention is limited only by the claims that follow.

Figure 1:
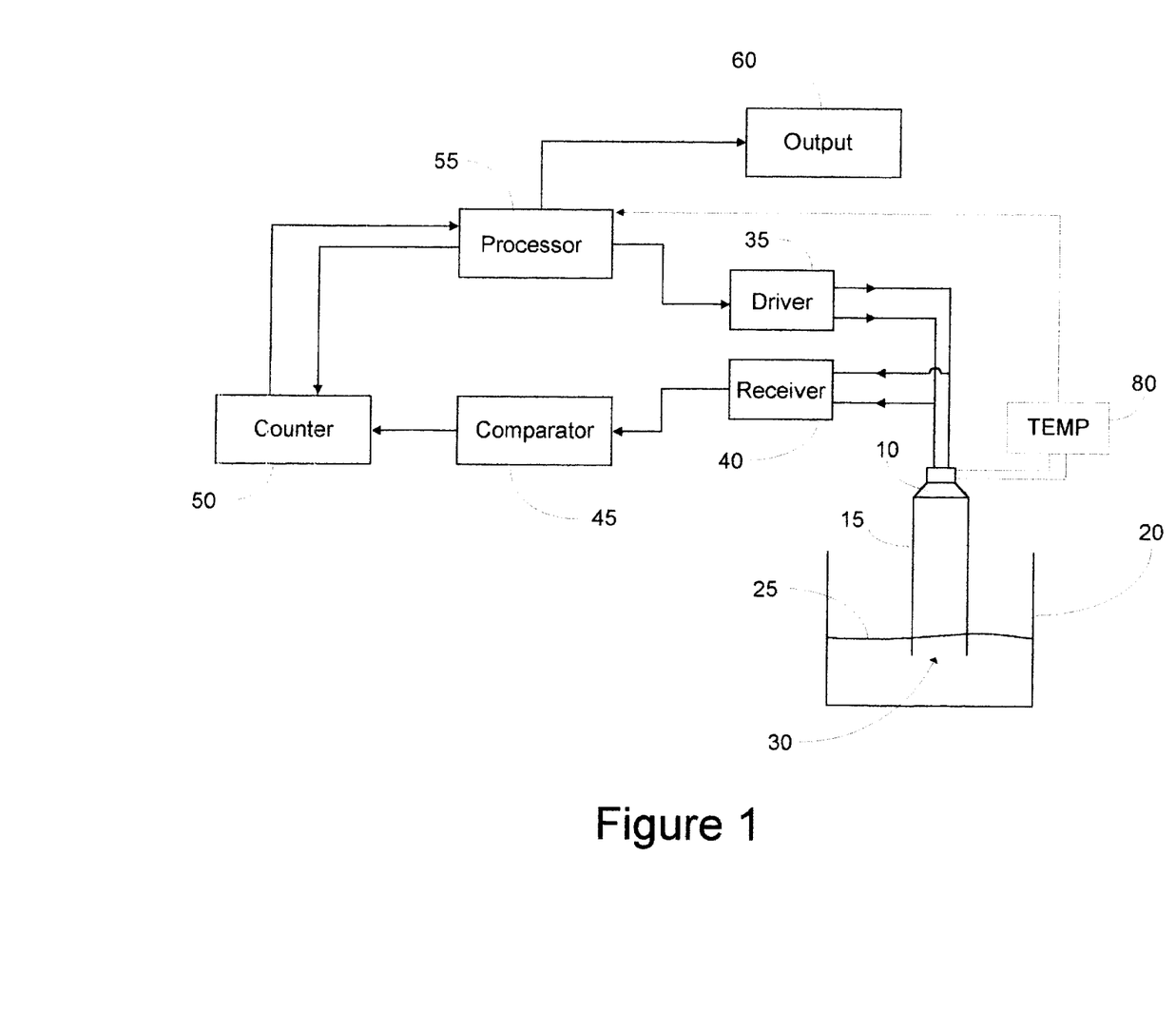
FIG. 1 is a schematic depiction of a sensor that is in accord with the principles of the present invention.

A sensor system that is in accord with the principles of the present invention is shown in FIG. 1. At this time, that sensor system should be understood as operating to sense the level of a material in a tank. As shown, an acoustic assembly 10 is located so as to be able to inject sound into a tube 15. That tube is located in a tank 20 that holds a material 25. The free end 30 of the tube is positioned at a predetermined location. When the sensor system is used as a point level sensor the free end 30 is beneficially located at a sensing point. However, while beneficial, that is not necessary as the principles of the present invention also enable sensing points within the body of the tube 15 (as is subsequently described).

Figure 2:
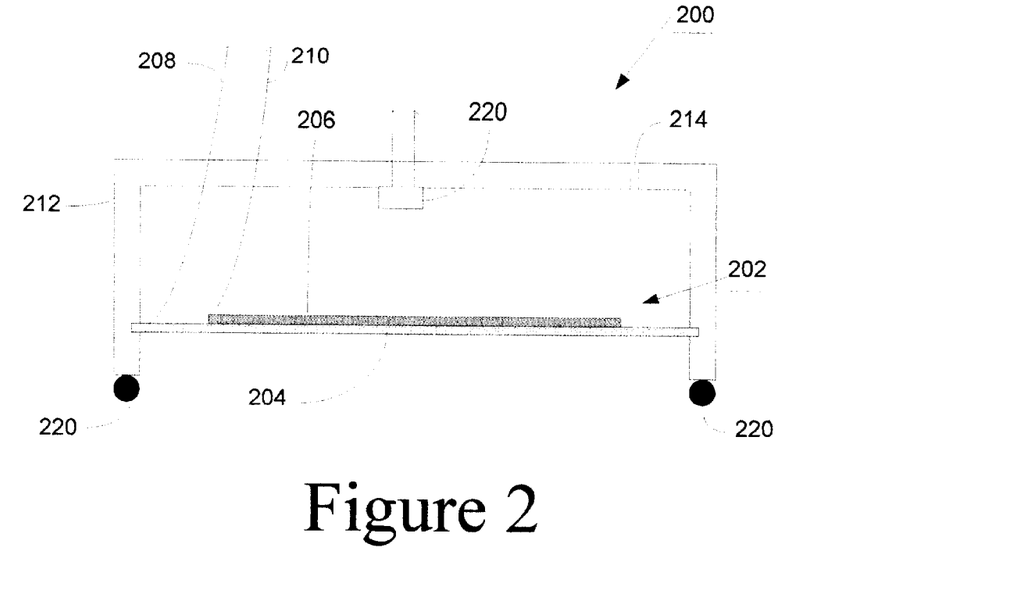
FIG. 2 is a schematic, cross-sectional view of an acoustic assembly that is in accord with the principles of the present invention.

One embodiment the sensor system uses an acoustic assembly 10 that takes the form of the acoustic assembly 200 illustrated in FIG. 2. As shown, the acoustic assembly 200 includes a piezoelectric transducer 202, such as Project Unlimited's Part Number KBI-2064. The piezoelectric transducer 202 includes a 20 mm diameter brass plate 204 and a piezoelectric disk 206. An electrical lead 208 connects to the brass plate 204 while an electrical lead 210 connects to the piezoelectric disk 206. Those leads interconnect with the sensor system illustrated in FIG. 1. The brass plate 204 is connected to a housing 212, (beneficially of a plastic) that includes an opening 214. The opening 214 ensures that the pressure above the piezoelectric transducer 202 and below the piezoelectric transducer 202 are substantially the same. It should be understood that a discrete opening 214 is not required, pressure equalization can be provided by any number of means, including gas leakage where the housing 212 retains the brass plate 204.

Still referring to FIG. 2, the acoustic assembly 200 includes a vibration mount, specifically in FIG. 2 a rubber O-ring 220. The rubber O-ring 220 dampens vibration to and from the body of the tube 15 (see FIG. 1). Without a vibration mount, mechanical vibrations in the tube body can mask acoustic resonances attempted to be set up in the tube 15. Furthermore, the body of the tube 15 can go into resonance, producing a false standing wave.

The biggest problem with the level sensor described in U.S. patent application Ser. No. 09/854,500 was its sensitivity to the tube being used. With vibration dampening provided by the rubber O-ring 220, system operation closely follows design theory and operation over time and temperature is greatly improved. While vibration dampening and/or avoidance between the tube 15 and the piezoelectric transducer 202 is important, vibration dampening using an O-ring is not required. For example, the piezoelectric transducer 202 could be suspended without direct contact with the tube 15, such as by a magnetic suspension system or by using thin strings. However, O-rings are low cost, easily implemented, readily available, and effective.

Still referring to FIG. 2, the acoustic assembly 200 can include a thermal sensor 220. This is beneficial because the velocity of sound in the tube 15, and thus the resonant frequency, depends on temperature. In some applications (for example with most continuous level sensors) it is highly beneficial to compensate readings for temperature. This can be easily achieved by simply monitoring the output of the thermal sensor 220. National Semiconductor produces an easily used line of semiconductor temperatures sensors that can readily fit within the acoustic assembly 200. Reference National Semiconductor's LM35 series of temperature sensors.

Figure 3:
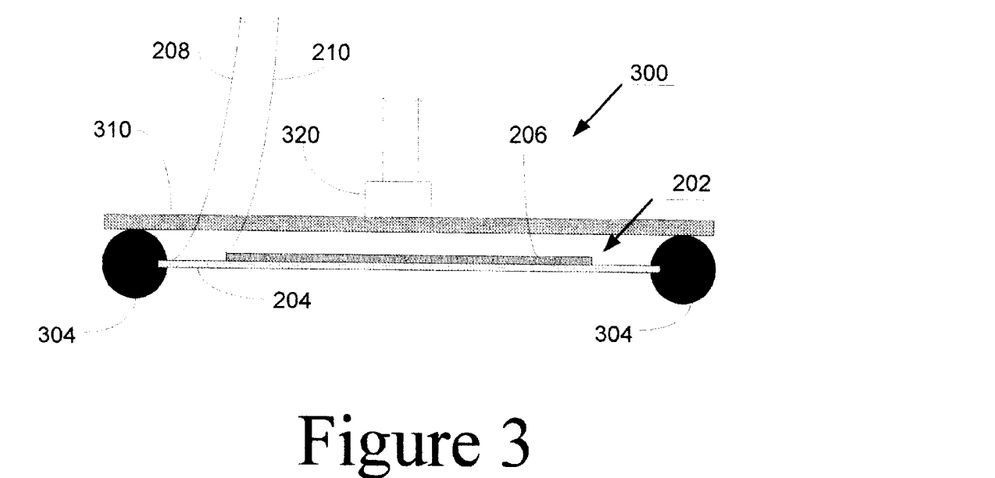
FIG. 3 is a schematic, cross-sectional view of another acoustic assembly that is in accord with the principles of the present invention.

Another embodiment of the acoustic assembly 10 is the acoustic assembly 300 illustrated in FIG. 3. As shown, the acoustic assembly 300 includes the piezoelectric transducer 202. That piezoelectric transducer 202 includes the brass plate 204 and the piezoelectric disk 206. Further, the electrical lead 208 connects to the brass plate 204 while the electrical lead 210 connects to the piezoelectric element 206. Those leads interconnect with the sensor system illustrated in FIG. 1.

Unlike in the acoustic assembly 200, in the acoustic assembly 300 the brass plate 204 is mounted directly to a rubber ring 304. The ring 304 includes a small slit that receives the edge of the brass plate 204. Further, the acoustic assembly 300 includes a round plate 310 (beneficially of a thermally conductive metal) that sits on the ring 304. While not specifically shown, beneficially an opening ensures that the pressure above the piezoelectric transducer 202 and below the piezoelectric transducer 202 are substantially the same.

Still referring to FIG. 3, the ring 304 provides both vibration dampening and direct mounting of the piezoelectric transducer 202. Beneficially, the ring 304 is a straight piece of rubber (VITON is preferred because of its chemical resistance) that is slit with a sharp blade. The rubber piece is then rapped around the edge of the piezoelectric transducer 202. Then, the acoustic assembly 300 is located within the tube 15. The walls of the tube then retain the acoustic assembly 300 together. Preferably, when using the acoustic assembly 300 the tube 15 is fabricated with a wall or notch within the tube that receives the ring 304. Then, a filler (such as epoxy) can be located over the acoustic assembly 300 to provide a seal that isolates and protects the acoustic assembly 300. While FIG. 3 shows a round (in cross-section) ring, a quad-cord (also known as a four-lobe cord) might be better as it is easier to handle during slitting. EPM, Inc. of Stockbridge, Ga. produces 0.210" VITON quad cord. Other suppliers provide other types of cord (square cord also seems promising).

Still referring to FIG. 3, the acoustic assembly 300 can include a small heater 320. When the tube 15 is sensing a liquid the humidity within the tube increases to 100%. A change in temperature can cause the vapor in the tube 15 to condense to moisture that forms on the piezoelectric transducer 202. Such moisture can impede system operation. An easy way to prevent this is to slightly raise the temperature of the piezoelectric transducer 202. A simple way to do that is to include the small heater 320, which can raise the temperature of the piezoelectric transducer 202. If the plate 310 is a thermal conductor, the heater 320 can be on the outside of the plate 310. Furthermore, since the brass plate 204 is a good thermal conductor, condensation on both sides of the brass plate 204 can be reduced. In practice, a half-watt or even a quarter-watt resistor can provide sufficient heat to prevent condensation in many applications. However, when the heater 320 is used with a thermal sensor 220 (see FIG. 2) it is beneficial to either carefully mount a thermal sensor 220 within the acoustic assembly 300 or to compensate for the heat provided by the heater 320.

In almost all applications it is beneficial to protect the piezoelectric disk 206 from condensation or corrosive gases. One way of doing so is to coat the piezoelectric disk 206 with a thin, flexible protective coating. A thin coat of a semi-flexible epoxy is suitable. If the brass plate 204 is subject to corrosive damage, either a piezoelectric transducer 202 having a stainless steel plate could be used, or a protective coating could be applied to the brass. Furthermore, for ease of assembly, it is beneficial to mount the piezoelectric transducer along its edge and with the bottom surface of the plate 204 being open.

Turning now once again to FIG. 1, the tube 15 is beneficially a 3–7" length of a material that will perform adequately in the material 25. PVC, 100 PSI plumbing tubing fabricated with a mount at one end to hold the acoustic assembly 10 is good in many application. In the system illustrated in FIG. 1, the acoustic assembly 10 is attached via the bottom of a ring (the O-ring 220 or the ring 320) to one end of the tube 15 using a flexible silicon adhesive/sealant.

Still referring to FIG. 1, a driver 35 drives the acoustic assembly 10 such that the acoustic assembly 10 produces sound within the tube that could produce a standing wave in the tube 15. Whether a standing wave is produced depends on the level of the material 25 and the sound frequency that is produced. In one embodiment, a point level sensor, acoustic resonance (a standing wave) is produced when the driver 35 drives the acoustic assembly 10 with a frequency Fc:

$$Fc = nc/2L$$

(referred to hereinafter as the closed tube equation)

where n=1, 2, 3, . . . , c is the speed of sound in the tube (which is temperature dependent), and L is the length of the tube.

In another embodiment, another point level sensor, acoustic resonance is produced when the driver 35 drives the acoustic assembly 10 with a frequency Fo:

$$Fo = (2n-1)c/4L$$

(referred to hereinafter as the open tube equation)

wherein n=1, 2, 3, . . . , c is the speed of sound in the tube, and L is the effective length of the tube. By effective length it is meant the actually distance between the acoustic assembly 10 and the end of the tube, plus an "end correction factor" that depends on the diameter of the free end. Tests indicate that the end correction factor is about 0.6 to 0.8 times the diameter of the free end.

While the foregoing has described point level sensors that depend on whether the material 25 has or has not closed the free end 30, such is not necessary. For example, a point level sensor can be implemented in which the sensing position is within the tube 15. The resonant frequency with the material at the sensing position is then determined from the closed tube equation, where L is now the distance from the acoustic assembly 10 to the sensing position. That frequency is then used in an attempt to produce resonance. If resonance is detected the level of the material 25 is known to be at the sensing position. Furthermore, higher frequencies can be scanned to determine if the level of the material 25 is above the sensing position. This type of implementation is particularly valuable in applications where the sound emitted by the acoustic assembly 10 is objectionable. In such applications it is beneficial to mount the tube 15 such that the material 25 always fills the free end of the tube, to vibration mount the acoustic assembly 10 within the tube, and to seal the (other end of the) tube. That way sound is contained within the tube. Vibration mounting the piezoelectric transducer is highly beneficial. In applications where the sensing position is adjustable, or is set at a later time, it is beneficial to sense a position within the tube 15.

Of course, the resonant frequency at the sensing position is temperature sensitive. Thus, it is beneficial to compensate the resonant frequency for temperature, for example by using a thermal sensor such as the thermal sensor 220 in FIG. 2. To assist thermal sensing, the sensor of FIG. 1 includes a temperature network 80 that senses the temperature of within the tube. Then, the speed of sound (and the resonant frequency) can be temperature compensated. Furthermore, the temperature network 80 can also provide power to a heater 320 (see FIG. 3) to prevent condensation.

Another method exists for temperature compensating the sensing position. That method is particularly beneficial when the sensing position is at end of the tube 15. That is, simply by producing a plurality of frequencies that could produce resonance, with the "could" being dependent on temperature. For example, by producing a frequency that could produce resonance at 0° C., than another frequency that could produce resonance at 1° C., and so on. By scanning the possible resonance frequency over the temperature range of interest, an actual temperature determination is not required.

Still referring to FIG. 1, it should be noted that the driver 35 does not drive the acoustic assembly 10 continuously. The driver 35 simply drives the acoustic assembly 10 long enough to produce a standing wave (resonance) in the tube 15. For example, it has been determined that when the material 25 is water, if the driver 35 drive the acoustic assembly 10 with about 80 cycles a strong standing wave results. The more cycles used the longer it takes to complete a frequency sweep, thus reducing the number of cycles is beneficial. After the driver 35 completes driving the acoustic assembly 10 the driver switches to a high impendence state. Beneficially such that one side of the acoustic drive line (which goes to electrical conductor 208 of FIGS. 2 and 3) is at ground, while the other acoustic drive line (which goes to electrical conductor 210 of FIGS. 2 and 3) has a relatively high impedance to ground (about 20K ohm is good).

A receiver 40 then amplifies electrical signals from the acoustic assembly 10. As noted above, the driver 35 is in a high-impedance state. The receiver 40 amplifies the electrical signals from the acoustic assembly 10 (on the leads 208 and 210) that are produced by acoustic decay in the tube 15. A gain of about 5–10 is sufficient. U.S. patent application Ser. No. 09/854,500 described the need for a high gain. That high gain is believed to have been required because of the transducer that was being used. Using a high-speed op-amp, such as the TL082, is beneficial. Alternatively, a single-stage transistor amplifier with an un-bypassed emitter resistor can be used. A single-stage transistor amplifier has the advantage of not requiring positive and negative supplies, as well as being low cost. But, if the thermal sensor 220 is being used, and if it requires both positive and negative supplies, a negative supply is available and the use of op-amps is beneficial as op-amps typically include DC stabilization, which simplifies subsequent designs.

The output of the receiver 40 is applied to a comparator 45 that converts the signals amplified by the receiver 40 into digital pulses. A 0.3 volt DC offset between the positive and negative terminals is appropriate. A-common LM311 comparator works well. However, to prevent oscillations it is beneficial to include hysteresis. Many comparators, such as Maxim's MAX 909 include built-in hysteresis.

The pulse outputs of the comparator 45 are input to a counter 50. The operation of the counter 50 is controlled by a processor 55, which also controls the driver 35, and which beneficially receives temperature information from the temp circuit 80. The processor 50 is beneficially controlled by a software program. After the processor 55 stops the driver 35 and places it into its high-impedance state, the processor 55 delays for a short period of time (say 12 millisecond). This gives the acoustic assembly 10 sufficient time to stop ringing. Then, the processor 55 resets the counter 50 to zero. Then, the counter 50 counts the pulses from the comparator 45. Those pulses represent the sound in the tube 15, which is decaying. That decay will cause the sound to attenuate. Resonance produces a large number of pulses, while none resonance produces few. The number of pulses that are counted depend on (among other factors) the amplification of the receiver 40 and the DC offset of the comparator. Again, if resonance occurred, the sound as it decays in the tube 15 produces a relatively larger number of pulses. Otherwise, few or no pulses occur. After a period of time sufficient for the resonance to decay (say about 15 milliseconds), the processor 55 reads the content of the counter 50.

After the processor 55 reads the counter 50, the processor makes a decision as to whether resonance has or has not occurred. That decision is based on the content of the counter 50 and an internal "trip point" stored within the processor. For example, in a 5 inch tube with the free end closed by water, in one experiment the counter 55 contained a reading of 36. Away from resonance, the counter reading fell below 10. Near, resonance the reading was 27–28. However, in all cases resonance was readily detected. In any event, with a point level sensor, if the counter reading is high enough the processor determines that resonance occurred, and that the material 25 has reached the sensing position. Otherwise the processor determines that resonance did not occur, and thus that the material 25 being sensed has not reached the sensing position. Based on resonance, the processor 55 causes an appropriate output from an output device 60, such as a signal light, a relay, or a controller.

In practice, the counter 50, the processor 55, and the driver 35 are functions of a microcontroller. For example, the system shown in FIG. 1 beneficially uses a Microchip 12C672 microcontroller, which is a small, 8 pin device having an internal counter and an analog-to-digital converter. The analog-to-digital converter is beneficial in that the output of the temperature circuit 80 is easily converted to a digital signal that is useful for the processor.

In many applications the processor will sweep frequencies to find resonance. This is beneficial to determine whether the material level is above the sensing position (resonance will occur at a higher frequency), or to compensate for temperature (by scanning the range of frequencies that could produce resonance over a temperature span). In other applications the processor will use information from the thermal sensor 80 to determine what frequency would produce resonance if the material level is at the sensing position.

However, in other applications the processor 55 will sweep over a range of frequencies to find the frequency that actually produces resonance. To do so, the contents of the counter 50 for each frequency that is being used is stored in memory. Then, the frequency that produced the highest counter reading, that frequency being the resonant frequency, is determined. From that frequency, the processor 55 determines the parameter of interest. For example, if temperature is being sensed the temperature is found from the resonant frequency, If distance is being determined, the resonant frequency is used to determined the distance from the acoustic assembly 10 to the level of the material 25.

Thus, the level sensor of FIG. 1 can be used to as a continuous level sensor to determine the level of the material 25 within the tube. That is beneficially accomplished by starting at the lowest possible resonant frequency (longest wavelength) and then frequency sweeping to find the frequency that produces resonance. Then, with that frequency determined, and with the operating temperature known, the distance from the acoustic assembly 10 to the level of the material 25 can be determined from the formula:

$$L = nc/2F_c,$$

where n=1, 2, 3, . . . , where c is the speed of sound in the tube, L is the distance from the acoustic assembly 10 to the level of the material 25, and Fc is the frequency that produced resonance.

Now, if the distance L is fixed (say by sealing the end of the tube and mounting the acoustic assembly 10 in a fixed position), then by finding the resonant frequency Fc, the temperature within the tube can be determined. The speed of sound (c) is approximately equal to:

$$c = 331.5(1+T/273)^{1/2}$$

Solving for c in the closed tube formula produces:

$$c = 2LF_c/n, \text{ or}$$

$$331.5(1+T/273)^{1/2} = 2LF_c/n$$

That formula can be easily solved for T (with n being taken as 1). Beneficially, a "look-up table" can be used to find T from $F_c$, with the table being based on L and the range of temperatures of interest. Alternatively, an open ended tube could be used to determine temperature by using the open tube formula.

Figure 4:
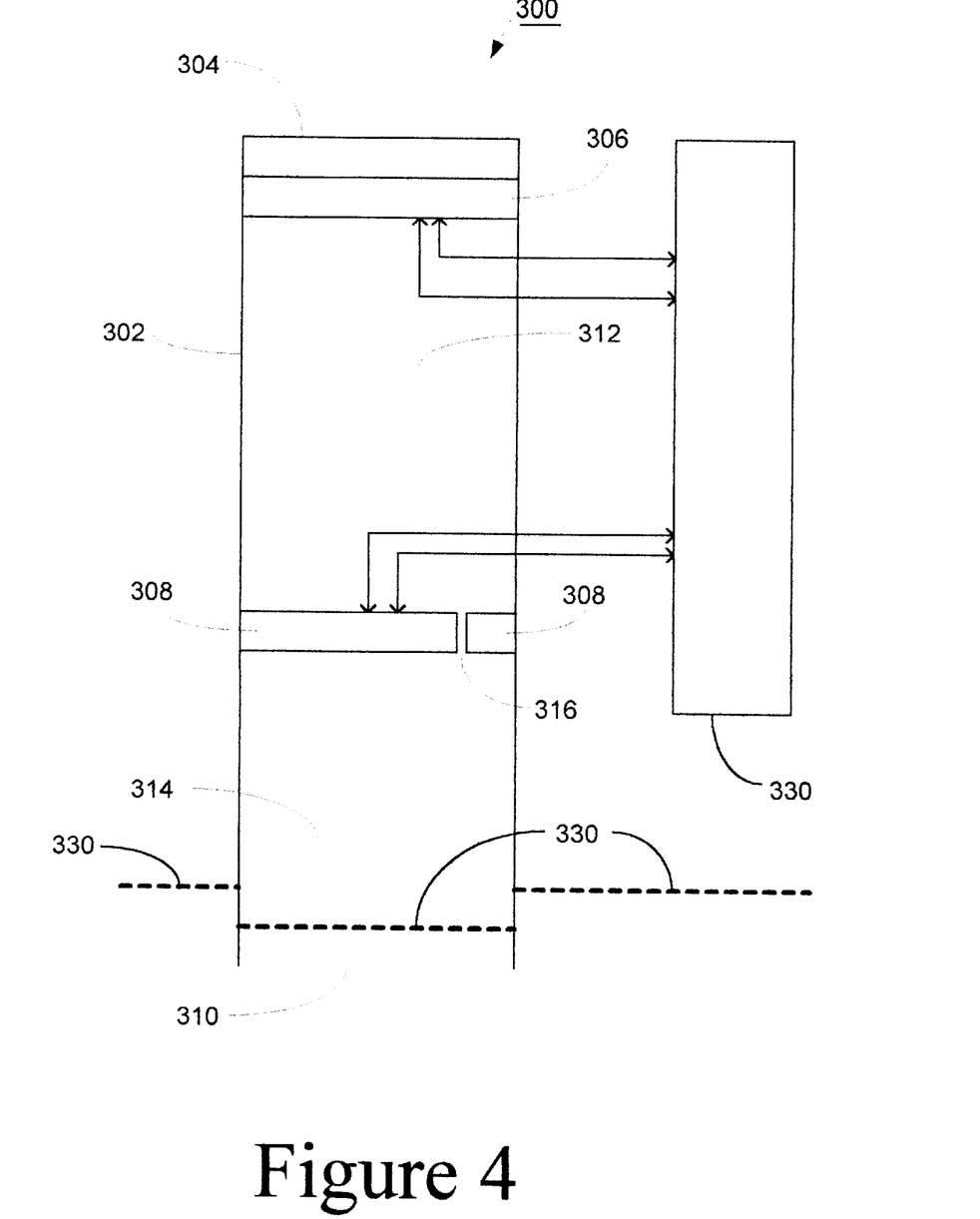
FIG. 4 is a schematic depiction of a pressure sensor that is in accord with the principles of the present invention.

The foregoing has described in detail point level sensors, continuous level sensors, and temperature sensors, However, the principles of the present invention also provide for other types of sensors. For example, FIG. 4 provides an embodiment of a pressure sensor 300 according to the principles of the present invention. As shown, the pressure sensor 300 includes a tube 303 having a seal 304 at one end. Inside the tube 302 is a first sensor 306 and a second sensor 308. The tube 302 has an open end 310 for receiving a material 311. The second sensor 308 divides the tube 302 into two sections, a top volume 312 and a bottom volume 314. An opening 316 connects the top volume 312 and the bottom volume 314 together such that they have the same pressure. An electronic network 330 drives the first and second sensors as required, and then, based on acoustic decay, determines a variable of interest. The electronic network 330 should be understood as containing receivers, drivers, counters, processors and comparators as described above.

In operation, the first sensor 306, which is a known distance from the second sensor 308 is driven so as to measure temperature using the method described above. Thus, the temperature in the pressure sensor probe 300 is determined. The second sensor 314 is driven so as to determine the distance from the second sensor to the surface of the material 311 in the tube.

Still referring to FIG. 4, as shown, the level of the material 311 in the tube is not the same as the level of the liquid outside of the tube. That is because as the material 311 rises above the open end 310 and into the tube, a fixed amount of gas is trapped inside the tube, with that amount depending on the volume of the top section 312 and the bottom section 314. As the level of the material 311 rises, pressure builds up inside the tube 302. That pressure causes the level of the material 311 inside the tube to be different than it is outside the tube. Thus, the distance from the second sensor to the surface of the material 311 in the tube depends on the height of the material 311 outside of the tube, as modified by pressure build-up inside the tube. A well known relationship between temperature, pressure, and volume is:

$$PV = \eta RT$$

where P is pressure, V is volume, R is a constant, T is temperature, and η, which is used in place of the more traditional n, relates to the number of gas molecules in the tube. Once the material reaches the open end 310 the value of ηR is fixed, and thus a relationship can be used:

$$P_1 V_1 / T_1 = P_2 V_2 / T_2$$

where the subscript 1 refers to a first time and the subscript 2 refers to a second time, If the subscript 1 refers to a calibration time, the value of $P_1 V_1 / T_1$ represents a constant k. Thus: $P_2 = k T_2 / V_2$.

But, $V_2$ represents the volume of the top section 312 plus the volume of the bottom section 314. Furthermore, the volume of the bottom section depends on the measured distance from the second sensor 308 to the level of the material. Thus, the measured distance from the second sensor 308 to the level of the material can be used to determine pressure.

Alternatively, as the height of the material 311 outside the tube is relates to both pressure inside the tube and the density of the material 311, if the pressure sensor 300 can be used to determine the density of the material 311.

An additional note about the pressure sensor in FIG. 4, there is no need to arrange the two sensors in a line. One sensor can be in one tube, the other sensor can be in another tube, and then those tubes can be tied together using a hose or connector of some sort. Furthermore, using the first sensor 306 to determine temperature is not required. A standard temperature sensor (such as the LM 35) can be used instead. Beneficially, the volumes can be adjusted to provide the desired pressure sensing range (or density sensing range). Indeed, a separate chamber that takes the place of the volume 312 and that has a variable volume would be beneficial. If that volume depends on the ambient pressure an absolute pressure sensor can be made. A large total volume can provide a pressure sensor suitable for use with low pressure fluids. A small volume will increase the pressure sensing range, but at the cost of sensitivity.

U.S. patent application Ser. No. 09/854,500 described problems with operating frequencies not being ideally. However, vibration mounting the acoustic assembly 10 isolates it from the body of the tube and produces a system in which the operating frequencies are close to ideal. However, some comments may be helpful. First, while the tube length is not critical, operating a system such that problems related to the integer n are avoided is recommended. For example, if the system is resonant at 1000 Hz it also may be resonate at 2000 Hz (or at another frequency, thus the foregoing formulas should be kept in mind). Particular care should be given to avoiding sweeping a span of frequencies that include frequencies that will produce resonance with the tube open and with material in the tube 15. However, it is possible to use multiple frequencies as a "safety" check. For example, it is possible to test at one frequency, determine a result, and then verify that result using another frequency. It is also possible to skip around frequencies. For example, say the frequency 3500 will produce resonance with the end open and resonance with the material at a position X within the tube. Then, the frequency of 3500 should be avoided. The position X can still be sensed by changing the value of n in the formulas. However, it should be pointed out that using higher values of n in the formulas produces very "sharp" resonances that require small frequency changes to find resonance. Another "safety" check is to test for an open free end at one frequency, and then look for a closed free end at another frequency. The readings should be consistent.

The foregoing described the use of a trip point number to determine resonance. A suitable trip number should be based upon the particular system implementation and use. For example, if a frequency A produces a count of 40 when the free end is open, and a count no higher then 5 when the free end is closed, an acceptable trip number might be 22.

An acceptable trip number can also be arrived at by measurement. First, take a reading at a frequency that does not produce resonance either when the free end is open or closed. Then, increased that number (say double it). For example, if frequency B produces a reading of 4, an acceptable trip number might be 8.

Regarding piezoelectric elements, there are, in general, three different ways to mount such elements: center mount, nodal mount, and edge mount. There are also two different types of edge mountings: rigid clamp and flexible mount. Given the results currently available, it appears that edge mounting works best, at least when the acoustic assembly is vibration mounted relative to the tube. Whether rigid clamp of flexible mounting is used does not seem to matter, provided that the acoustic assembly is vibration mounted.

It should be understood that the forgoing use of the term material specifically includes a piston or a rod. Thus, the principles of the present invention enable the acoustic determination of the position of a rod or piston.

It is to be understood that while the figures and the above description illustrate the present invention, they are exemplary only. Others who are skilled in the applicable arts will recognize numerous modifications and adaptations of the illustrated embodiments that remain within the principles of the present invention. Therefore, the present invention is to be limited only by the appended claims.

What I claim is:

1. A continuous level sensor, comprising:

a tube having a body with a first end for receiving a material;

an acoustic transducer for producing sound in said tube;

a driver for driving said acoustic transducer at a plurality of frequencies, wherein said acoustic transducer is driven for a time sufficient to produced resonance;

a decay sensor for sensing sound decay in said tube; and a processor for determining the position of the material in said tube based on the sound decay of a resonant frequency in said tube.

2. A continuous level sensor according to claim 1, wherein said processor controls the frequencies produced by the driver.

3. A continuous level sensor according to claim 1, further including a temperature sensor operatively connected to said processor, wherein said processor determines the position of the material in the tube after correcting for temperature effects on the speed of sound.

4. A continuous level sensor according to claim 1, further including a vibration mount for locating said acoustic transducer such that it can produce sound in said tube and such that vibrations between the acoustic transducer and the tube body are suppressed or eliminated.

5. A continuous level sensor according to claim 1, wherein said vibration mount includes a rubber ring disposed between the acoustic transducer and the tube body.

6. The continuous level sensor of claim 1, wherein said acoustic transducer is a piezoelectric element.

7. The continuous level sensor of claim 1, further including a coating on said acoustic transducer.

8. The continuous level sensor of claim 1, further including a heater for preventing condensation on said acoustic transducer.

9. The continuous level sensor of claim 1, further including a vibration mount for locating said acoustic transducer such that it can produce sound in said tube and such that vibrations between the acoustic transducer and the tube body are suppressed or eliminated.

10. The continuous level sensor of claim 1, wherein said processor determines the position of the material based on a closed tube equation.

11. The continuous level sensor of claim 1, further including a display for indicating the position of the material.

12. The continuous level sensor of claim 1, wherein said acoustic transducer is mounted in a pressure equalized housing.

13. The continuous level sensor of claim 12, wherein said housing includes an opening.

* * * * *